US010388446B2

(12) United States Patent
Ott et al.

(10) Patent No.: US 10,388,446 B2
(45) Date of Patent: Aug. 20, 2019

(54) METHOD FOR MANUFACTURING A POLE TUBE FOR AN ELECTROMAGNET

(71) Applicant: Robert Bosch GmbH, Stuttgart (DE)

(72) Inventors: Christof Ott, Asperg (DE); Klaus Schudt, Nordheim (DE); Friedrich Moser, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 14/571,672

(22) Filed: Dec. 16, 2014

(65) Prior Publication Data

US 2016/0172091 A1 Jun. 16, 2016

(30) Foreign Application Priority Data

Dec. 19, 2013 (DE) ........................ 10 2013 226 619

(51) Int. Cl.
*H01F 7/06* (2006.01)
*H01F 7/16* (2006.01)
*H01F 7/08* (2006.01)

(52) U.S. Cl.
CPC ........... *H01F 7/1607* (2013.01); *H01F 7/081* (2013.01); *H01F 2007/085* (2013.01)

(58) Field of Classification Search
CPC .................................. H01F 7/16; H01F 41/00
USPC ............. 29/602.1, 605, 606, 603.24, 603.26, 29/603.236; 335/229, 297
See application file for complete search history.

(56) References Cited

U.S. PATENT DOCUMENTS 4,697,619 A 10/1987 Tiefenthaler
6,848,919 B2 * 2/2005 Stitz .......................... H01F 7/06 336/90
7,033,156 B2 * 4/2006 Gakovic ............... B30B 15/065 425/352
7,913,369 B2 * 3/2011 Gakovic ............... B30B 15/065 29/401.1
8,322,499 B2 * 12/2012 Schmidt .................. F16F 9/466 188/267
8,413,950 B2 * 4/2013 Beck ................... F16K 31/0675 251/129.07
2010/0156580 A1 * 6/2010 Bill ........................... H01F 7/06 335/219

FOREIGN PATENT DOCUMENTS

CN 201689755 U 12/2010
CN 201818876 U 5/2011
CN 202001140 U 10/2011
CN 102788186 A 11/2012
DE 19821741 A1 11/1999

(Continued)

*Primary Examiner* — Paul D Kim

(74) *Attorney, Agent, or Firm* — Norton Rose Fulbright US LLP; Gerard Messina

(57) ABSTRACT

A method for manufacturing a pole tube having two magnetic pole tube components and having one nonmagnetic ring, which is situated axially between the pole tube components, for an electromagnet, in particular for a solenoid valve of an automatic transmission in a motor vehicle, including the following: concentric configuration and/or centering of the pole tube components and of the ring, in particular on a centering pin; form-fitting connection, in particular by extrusion coating and/or casting an exterior lateral surface of the pole tube components and of the ring.

7 Claims, 4 Drawing Sheets

(56) References Cited

FOREIGN PATENT DOCUMENTS

| | | | |
|---|---|---|---|
| DE | 10 2006 015070 | | 7/2007 |
| DE | 10 2006 011078 | | 9/2007 |
| DE | 10 2006 015233 | | 10/2007 |
| JP | H01250682 | A | 10/1989 |
| JP | 2001143924 | A | 5/2001 |
| JP | 2002538387 | A | 11/2002 |
| JP | 2003314731 | A | 11/2003 |
| JP | 2004150584 | A | 5/2004 |

* cited by examiner

METHOD FOR MANUFACTURING A POLE TUBE FOR AN ELECTROMAGNET

RELATED APPLICATION INFORMATION

The present application claims priority to and the benefit of German patent application no. 10 2013 226 619.7, which was filed in Germany on Dec. 19, 2013, the disclosure of which is incorporated herein by reference.

FIELD OF THE INVENTION

The present invention relates to a method for manufacturing a pole tube, in particular for a solenoid valve of an automatic transmission in a motor vehicle according to the description herein. The present invention also relates to a pole tube for an electromagnet, in particular for a solenoid valve of an automatic transmission in a motor vehicle according to the definition of the species in description herein. Furthermore, the present invention relates to electromagnets for solenoid valves according to the definitions of the species in the further description herein.

BACKGROUND INFORMATION

In modern automatic transmissions for passenger vehicles, hydraulically operated clutches are used for changing gears. In order for these shifting operations to take place without pressure and not be noticeable by the driver, the hydraulic pressure on the clutches must be adjusted with an extremely high precision according to predefined pressure ramps. Electromagnetically operated pressure control valves are used for this purpose. These pressure control valves may be configured either as seat valves or as slide valves.

Electromagnetic operation results in an electromagnetic force which is proportional to the coil current and which operates a hydraulic slide valve. For a high pressure precision, it is advantageous if the electromagnet has a precise force-current characteristic curve having a low variance of the force level. In addition, the resulting magnetic force should be largely independent of the position of the control piston or of the armature in the slide valve, i.e., the electromagnet should also have what may be a force-distance characteristic curve. A force hysteresis, which depends on the direction of movement or the direction of current, due to friction in the armature bearing or due to a hysteresis during magnetization of the magnetic circuit materials, should be avoided. Furthermore, a high force level of the electromagnets during use of the electromagnetically operated pressure control valves in automatic transmissions is desirable.

It is believed to be understood from DE 10 2006 011 078 A1 that a two-piece pole tube including a pole core and a bearing sleeve made of a thin nonmagnetic material may be provided to supply a low-friction bearing. Patent document DE 10 2006 015 233 B4 discusses a one-piece pole tube, which has a thinly turned location. Furthermore, DE 10 2006 015 070 A1 discusses a three-piece pole tube, in which a nonmagnetic ring is welded between two magnetic pole parts to prevent a magnetic short circuit.

To achieve a high force level of the electromagnetic actuating device, it is important for the radial air gaps between the pole tube and the armature to be configured small, if desired. Furthermore, even extremely minor eccentricities may result in an asymmetrical magnetic field, and therefore, transverse forces, which burden the armature bearing and cause increased friction. It is therefore important to position the components centrally (if desired) with respect to one another.

SUMMARY OF THE INVENTION

The problem on which the present invention is based is solved by a method for manufacturing a pole tube having two magnetic pole tube components and having a nonmagnetic ring situated axially between the pole tube components for an electromagnet, in particular for a solenoid valve, for an automatic transmission in a motor vehicle. Advantageous refinements are described herein. Features important for the present invention are also found in the following description and in the drawings, where the features may be important for the present invention, either alone or in various combinations, without having to mention this again explicitly.

The method according to the present invention includes the steps:

Concentric configuration and/or centering of the pole tube components and the ring, in particular on a centering pin;

Form-fitting connection, in particular extrusion coating and/or casting an exterior lateral surface of the pole tube components and of the ring.

A pole core and a magnet tube may advantageously be used as pole tube components. To accommodate an armature, the magnet tube has a through-hole, which may have the same inside diameter as the pole core. The pole tube components and the ring may be situated concentrically to a median longitudinal axis of the pole tube or of the centering pin. If the pole tube components and the ring are extrusion coated and/or cast, then a blind hole in the pole core, the through-hole in the magnet tube and the ring form a magnet space to accommodate the armature situated displaceably in the pole tube. Due to the concentric configuration and/or centering, a small joint clearance may be achieved prior to extrusion coating, the form-fitting connection being able to prevent a subsequent movement of the connected components due to the extrusion coating. The air gaps present in the magnetic circuit may be minimized due to the concentric configuration. In particular the air gap between the armature and the pole core, i.e., the radial air gap and the so-called "recess step" and the radial air gap between the movable armature and the magnet tube, which is referred to as a so-called "secondary air gap," may be minimized. Consequently, a pole tube having small radial air gaps in the "recess step" and in the "secondary air gap" may be manufactured using the method according to the present invention, so that high magnetic forces may be implemented, on the one hand, and a low friction armature bearing may be provided, on the other hand, since it is possible to prevent transverse magnetic forces due to eccentricities in the pole tube components and the nonmagnetic ring. Reworking of the armature bearing surface bordering the magnet space may be avoided since stresses cannot be introduced into the components, in contrast with connecting the pole tube components to the ring with the aid of a thermal joining method, such as welding, for example.

One advantageous refinement of the method provides that, prior to the concentric configuration and/or centering, grooves are applied to the lateral surface of the ring and/or knurls are applied to the lateral surface of the pole tube components. A better connection to the extrusion coating material or casting material is achievable through the knurls and/or grooves. It is advantageous to provide knurls on the magnetic components since knurls have less influence on the magnetic cross section. Grooves, which are advantageously easier to manufacture, may be provided on the nonmagnetic ring.

Additionally, it is provided that the pole tube components and a ring be used which have the same inside diameter. Thus, the pole tube components and the ring may be pushed onto a centering pin easily from above. Therefore, no special tool is required for centering and for concentric configuration of the pole tube components and the ring. If the pole tube components and the ring have the same inside diameter, then an armature bearing surface, which is largely without offset, may be provided.

Another advantageous embodiment of the present invention provides that a ring is used which has a smaller inside diameter than the magnetic pole tube components. The inside diameter of the ring may be only slightly smaller than the inside diameter of the pole tube components. The part of the ring extending in the direction of the magnet space may be used as a protruding friction bearing section for support of an armature in the pole tube. An internal collet chuck is advantageously used as a tool for the step of concentric configuration and/or centering since components having different diameters may also be situated concentrically to one another by using this tool. In particular, a ring made of a bearing metal, in particular brass or bronze, may be used in this embodiment. The effects of friction on the bearing location may be minimized by using a ring made of bearing metal.

The underlying problem on which the present invention is based is also solved by a pole tube for an electromagnet, in particular for a solenoid valve of an automatic transmission in a motor vehicle having the features of Claim 5. It is provided accordingly that an external lateral surface of the pole core, of the ring and of its magnet tube is extrusion coated using an extrusion coating or casting material, in particular a plastic. As explained at the outset, the air gaps present in the magnetic circuit may be minimized in the "recess step" and in the "secondary air gap" due to the concentric configuration. Consequently a high magnetic force with a low friction armature bearing at the same time may be provided with a pole tube according to the present invention.

One advantageous refinement of the pole tube provides that the ring has two conical sections facing away from one another in the axial direction, which cooperate with conical sections of the pole core and of the magnet tube. The conical sections therefore may have the same angle on the ring, on the pole core and on the magnet tube. During centering and/or concentric configuration of the components, the conical sections may then engage in or mesh with one another and ensure a high radial strength after the form-fitting connection by extrusion coating and/or casting. Thus, even at a high radial load, a decentering of the individual pole tube components is avoidable.

In addition, it is advantageous if the pole core and the magnet tube have knurls on the exterior lateral surface and/or if the ring has grooves on the exterior lateral surface. As already explained, a better connection to the casting material, for example, to plastic, may be achieved by applying knurls and/or grooves.

In addition, it is advantageous if the ring is manufactured from a bearing metal, in particular brass or bronze.

The pole tube, the intermediate piece and the magnet tube may have the same inside diameter. The pole tube components and the ring may then be simply pushed onto a centering pin for the manufacturing process.

Another advantageous embodiment of the pole tube provides that the intermediate piece has a smaller inside diameter than the pole tube and the magnet tube. When using a ring made of bearing metal, the section of the ring extending into the magnet space may then be used as a friction bearing section for supporting the armature in the pole tube.

The problem on which the present invention is based is also solved by an electromagnet for a solenoid valve having the features described herein. The electromagnet therefore has a bearing foil between the pole tube and a lateral surface of an armature situated in the pole tube. An offset may occur on the armature bearing surface in the concentric configuration of the pole tube components and the ring at the same inside diameters of the components in each case, this offset depending on the joint clearance prior to the extrusion coating and/or casting; the offset in the armature bearing surface may be compensated for by the flexibility of the bearing foil, which may be manufactured from plastic or a plastic-fiberglass.

Furthermore, the problem on which the present invention is based is solved by an electromagnet for a solenoid valve having the features described herein. Such an electromagnet has, on the side which faces away from the pole core, a friction bearing sleeve between the pole tube and a lateral surface of an armature situated in the pole tube. When using a pole tube in which the ring has a smaller inside diameter than the pole tube components, the part of the ring extending in the magnet space may be used as the first bearing point of the armature, and the friction bearing sleeve may be used as the second bearing point. Thus a simple two-point bearing which is inexpensive to manufacture is achievable.

In addition, it is advantageous if a coil, in particular a copper wire winding, is situated around the extrusion-coated lateral surface of the pole tube. The extrusion-coated lateral surface of the pole tube may be used here as a coil carrier. Because of the omission of thick-walled coil carriers, more space for the copper wire winding may then be created, so that a higher magnetic force may also be achieved.

Additional details and advantageous embodiments of the present invention are derived from the following description, on the basis of which the method shown in the figures and the specific embodiments shown in the figures are described and explained in greater detail.

DETAILED DESCRIPTION

Figure 1:
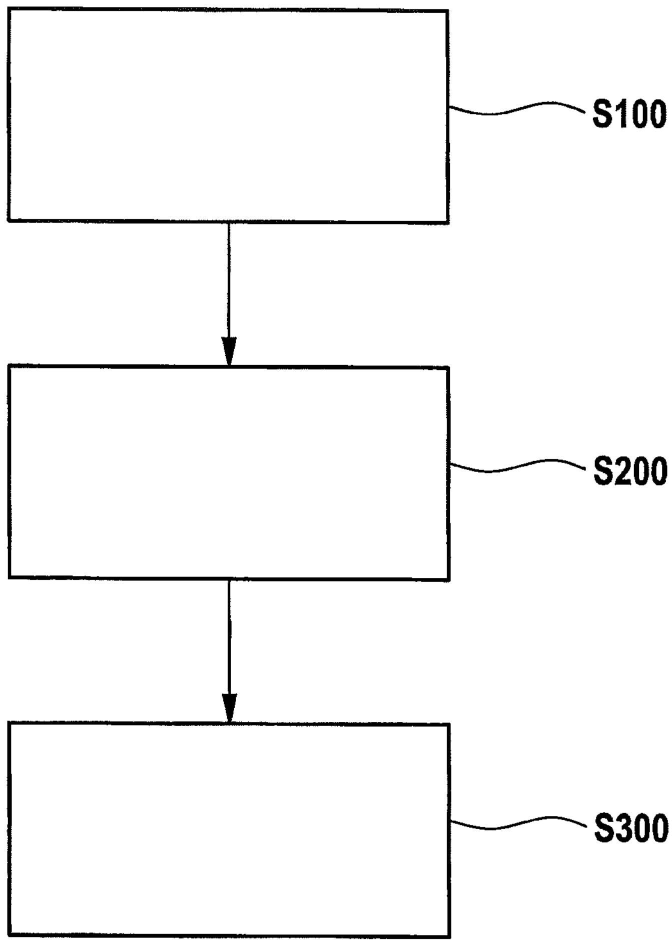
FIG. 1 shows a flow chart of the method according to the present invention.
Figure 2:
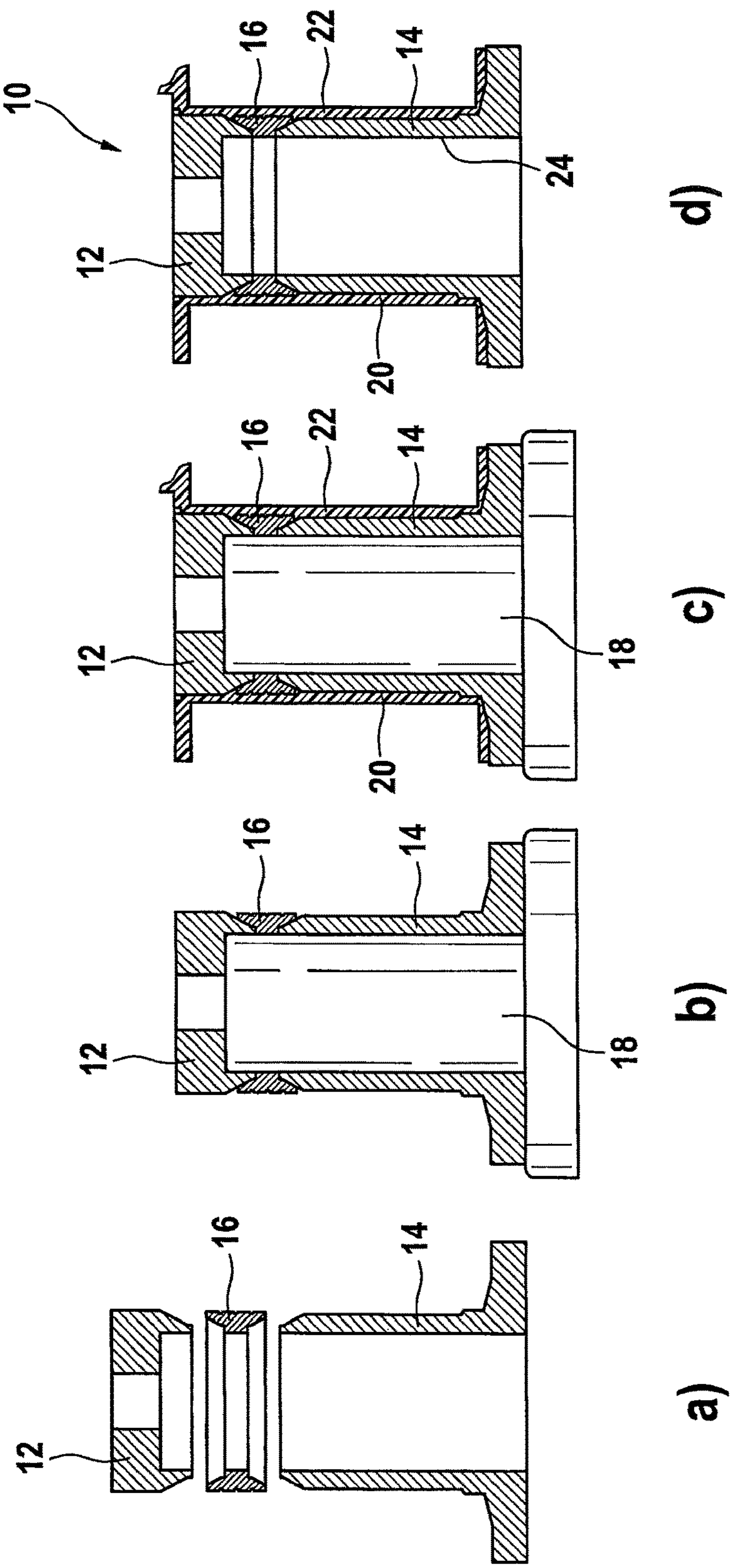
FIG. 2 shows the individual method steps of a method according to the present invention for manufacturing a pole tube according to the present invention.

FIG. 1 shows a flow chart for the method steps illustrated in FIG. 2. In a first step S100, grooves and/or knurls, not shown in FIG. 2 but indicated in FIGS. 3 and 4, are applied to a lateral surface of the components shown in FIG. 2*a*.

According to FIG. 2, pole tube 10 has a pole core 12 and a magnet tube 14. A nonmagnetic ring 16 is situated between pole core 12 and magnet tube 14.

In a second step S200, magnet tube 14, ring 16 and pole core 12 are attached to a centering pin 18 shown in FIG. 2*b* and are thereby positioned concentrically to one another. In a step S300, an external lateral surface 20 of pole core 12, magnet tube 14 and ring 16 is then extrusion coated and/or cast using extrusion coating or casting material, for example, plastic. This step is also shown in FIG. 2*c*. FIG. 2*d* shows pole tube 10 after step S300 having an extrusion coating or casting layer 22 applied to exterior lateral surface 20. Pole tube 10 according to FIG. 2*d* need not have an offset on armature bearing surface 24 formed in the interior of pole tube 10, i.e., between the inside diameters of pole core 12, magnet tube 14 and ring 16. Due to the high centricity of pole core 12, magnet tube 14 and ring 16, armature bearing surface 24 may be configured in such a way that small radial air gaps may be achieved between armature bearing surface 24 and an armature, not shown in FIG. 2, which may be situated displaceably in pole tube 10. Therefore, a high level of magnetic force may be achieved, on the one hand, and a low-friction armature bearing may be achieved, on the other hand.

Figure 3:
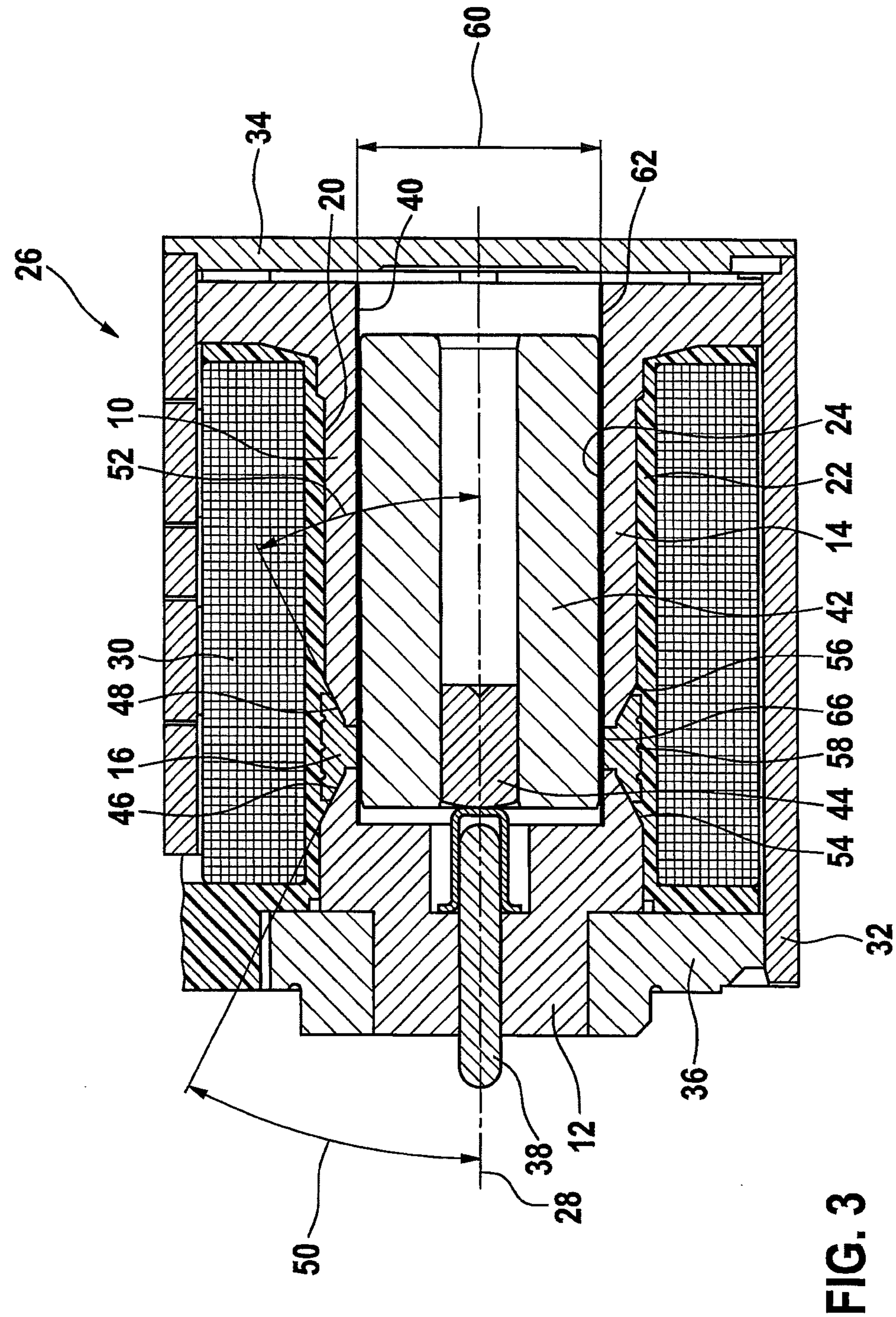
FIG. 3 shows a first specific embodiment of an electromagnet for a solenoid valve according to the present invention.
Figure 4:
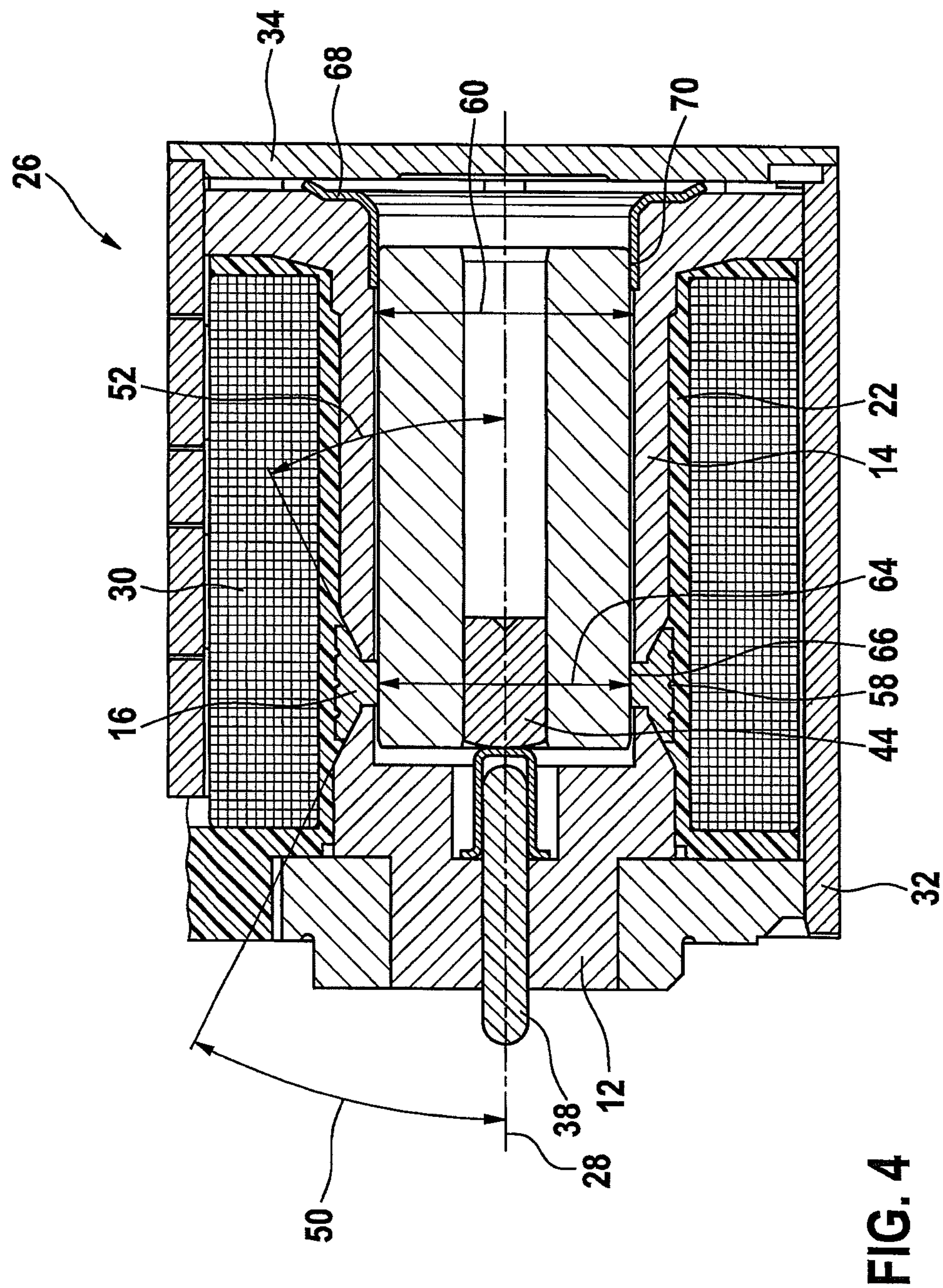
FIG. 4 shows a second specific embodiment of an electromagnet according to the present invention for a solenoid valve.

FIG. 3 shows a partial detail of a section through an electromagnet 26 according to the present invention for a solenoid valve having a pole tube 10 according to the present invention in a first specific embodiment. A pole tube 10 in electromagnet 26 is situated concentrically to a median longitudinal axis 28 of electromagnet 26. Pole tube 10 includes a pole core 12 and a magnet tube 14, both of which are made of magnetic material. Furthermore, pole tube 10 includes a nonmagnetic ring 16. An extrusion coating or casting layer 22 is molded onto an exterior lateral surface 20 of pole core 12, of magnet tube 14 and of ring 16. This extrusion coating or casting layer functions as a winding carrier for a coil 30 situated around it in the form of a copper wire winding. Coil 30 is delimited toward the outside by a cylindrical housing 32. On a right side in FIG. 3, housing 32 is sealed with a cover 34. A flow disk 36 is inserted at least partially into housing 32 on the side which faces away from cover 34.

Flow disk 36 has a central opening (no reference numeral) in which an operating pin 38 for a valve element is guided displaceably. Operating pin 38 is operable by an armature 42 supported in pole tube 10 or in opening 40 in armature bearing surface 24 and operable by an armature bolt 44 connected to armature 42. Ring 16 has a conical section 46, 48 on each of its sides facing pole core 12 and magnet tube 14. Conical section 46 extends at an angle 50 of approximately 30° to median longitudinal axis 28. Conical section 48 also extends at an angle 52 of approximately 30° to median longitudinal axis 28. Pole core 12 also has a conical section 54 on its side which faces ring 16, the angle of the conical section corresponding approximately to angle 50 of conical section 46. Furthermore, magnet tube 14 also has a conical section 56 on its side which faces ring 16, the angle of this conical section corresponding approximately to angle 52 of conical section 48. Knurls not shown in the figures are applied to one exterior lateral side of pole core 12 and of magnet tube 14.

Furthermore, grooves 58 are applied to the exterior lateral side of ring 16. Knurls and/or grooves 58 facilitate a connection of pole core 12, magnet tube 14 and ring 16 to the extrusion coating or casting layer 22. Due to conical sections 46, 48, which cooperate with conical sections 54, 56, a high radial strength of pole tube 10 is achievable by using the extrusion coating or casting layer 22. Pole tube 10, shown in FIG. 3, has an approximately constant diameter 60 in the magnet space. For compensation of possible component offsets between pole core 12, magnet tube 14 and ring 16 due to a joint clearance during the manufacture of pole tube 10, a bearing foil 62, which is made of plastic or plastic-fiberglass in particular, is provided in the magnet space between pole tube 10 and armature 42. During operation of electromagnet 26, shown in FIG. 3, armature 42 may be moved back and forth in the magnet space with a high magnetic force and a low friction, when coil 30 is energized and acts on operating pin 38 via armature bolt 44.

FIG. 4 shows a second specific embodiment of electromagnet 26 according to the present invention for a solenoid valve in a second specific embodiment of pole tube 10 according to the present invention. The components corresponding to the specific embodiment shown in FIG. 3 are labeled with corresponding reference numerals. Ring 16 of pole tube 10, in contrast with ring 16 of pole tube 10 in FIG. 3, has an inside diameter 64, which is slightly smaller than diameter 60, i.e., than the diameter of pole core 12 and magnet tube 14. Ring 16 of pole tube 10 shown in FIG. 4 is made of a bearing metal, in particular bronze or brass. A peripheral bearing location 66 may be provided for armature 42 in the magnet space due to its smaller inside diameter 64.

Furthermore, a friction bearing sleeve 68 is inserted into magnet tube 14 on the side facing away from pole core 12. This friction bearing sleeve 68 provides a second bearing location 70 for armature 42. Consequently, a two-point bearing may be provided in a simple manner without any offset between the components of pole tube 10. Using pole tube 10 shown in FIG. 4, the radial air gaps between armature bearing surface 24 and armature 42 may be still further reduced, since in the exemplary embodiment shown in FIG. 4, it is possible to omit the configuration of a bearing foil 62.

What is claimed is:

1. A method for manufacturing a pole tube for an electromagnet, the method comprising:
- concentrically aligning (a) a first magnetic pole tube component, (b) a second magnetic pole tube component, and (c) a nonmagnetic ring arranged axially between the first and second magnetic components;
- form-fittingly connecting the concentrically aligned (a) the first magnetic component, (b) the second magnetic component, and (c) the nonmagnetic ring; and
- extrusion coating a coating material onto exterior lateral surfaces of the nonmagnetic ring, first magnetic pole tube component, and the second magnetic pole tube component, wherein the coating material is molded onto and in contact with the exterior lateral surfaces of the nonmagnetic ring, the first magnetic pole tube component, and the second magnetic pole tube component,
- wherein, prior to the concentrically aligning, grooves are applied to the lateral surface of the ring.

2. The method of claim 1, wherein, prior to the concentrically aligning, knurls are applied to the lateral surface of the pole tube components.

3. The method of claim 1, wherein the pole tube components and the ring have the same inside diameter.

4. The method of claim 1, wherein an interior diameter of the ring is smaller than an interior diameter of the magnetic pole tube components.

5. The method of claim 1, wherein the electromagnet is for a solenoid valve of an automatic transmission in a motor vehicle.

6. The method of claim 1, wherein the concentrically aligning is performed on a centering pin.

7. The method of claim 1, wherein the application of the coating is applied by casting.

* * * * *